United States Patent [19]
Ooshita

[11] Patent Number: 6,072,593
[45] Date of Patent: Jun. 6, 2000

[54] IMAGE FORMING APPARATUS SYSTEM

[75] Inventor: Masakazu Ooshita, Kawasaki, Japan

[73] Assignee: Ricoh Company, Ltd., Tokyo, Japan

[21] Appl. No.: 09/057,445

[22] Filed: Apr. 9, 1998

[30] Foreign Application Priority Data

Apr. 9, 1997 [JP] Japan ..................................... 9-090940

[51] Int. Cl.[7] .............................. G06K 15/02; H04N 1/23
[52] U.S. Cl. .............................. 358/1.9; 358/1.7; 358/300
[58] Field of Search .............................. 382/305; 358/1.9, 358/1.7, 296, 300, 409; 347/247, 251

[56] References Cited

U.S. PATENT DOCUMENTS

| | | | |
|---|---|---|---|
| 5,438,648 | 8/1995 | Takaoka et al. | 358/1.6 |
| 5,465,165 | 11/1995 | Tanio et al. | 358/448 |
| 5,495,341 | 2/1996 | Kawana et al. | 358/298 |
| 5,522,017 | 5/1996 | Ueda | 358/1.16 |
| 5,606,648 | 2/1997 | Walther et al. | 358/1.7 |
| 5,778,159 | 7/1998 | Ito | 358/1.9 |

*Primary Examiner*—Scott Rogers
*Assistant Examiner*—Joel S. Shavghnessy
*Attorney, Agent, or Firm*—Oblon, Spivak, McClelland, Maier & Neustadt, P.C.

[57] ABSTRACT

An image data bus changing over section selects a multiple value image data bus at a time of outputting multiple value image data, while the image data bus changing over section selects a binary value image data bus at a time of outputting binary value image data. A synchronization clock changing over circuit puts the synchronization clock in a transmitting state for the multiple value image data, and puts the clock in a stopping state for the binary value image data. When the image data are changed over from the multiple value image data to the binary value image data, the clock is changed over from the transmitting state to the stopping state. When the image data are changed over from the binary value image data to the multiple value image data, the image data bus is changed over from the binary value image data to the multiple value image data.

12 Claims, 13 Drawing Sheets

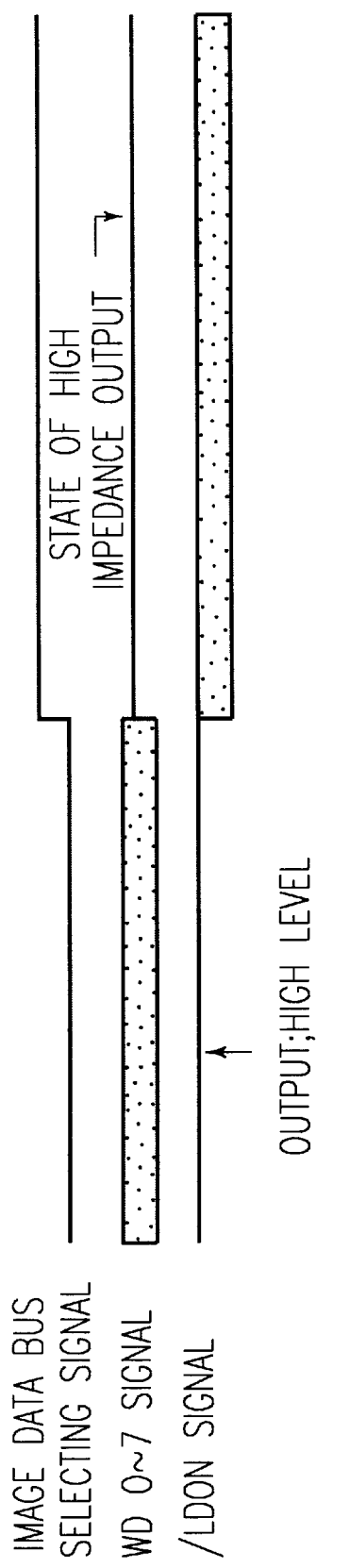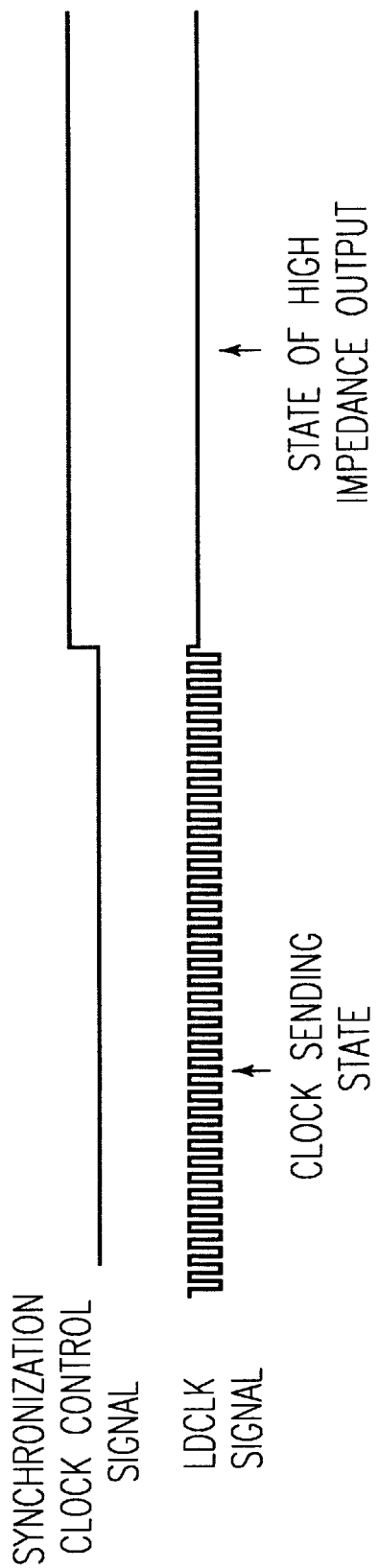
FIG. 4
FIG. 5

| D4 | D3 | D2 | D1 | D0 | D4-D0 | STATE OF LD |
|---|---|---|---|---|---|---|
| 1 | 1 | 1 | 1 | 1 | 1Fh | ALL LIGHTING-UP STATE |
| 1 | 1 | 1 | 1 | 0 | 1Eh | ALL FAINTLY LIGHTING-UP STATE(STATE OF LD MORE FAINTLY LIGHTING-UP THAN ALL LIGHTING-UP STATE) |
| ↓ | ↓ | ↓ | ↓ | ↓ | ↓ | |
| 0 | 0 | 0 | 0 | 1 | 01h | |
| 0 | 0 | 0 | 0 | 0 | 00h | ALL PULLING-OUT STATE |

IMAGE FORMING APPARATUS SYSTEM

BACKGROUND OF THE INVENTION

1. Field of the Invention:

The present invention is directed to an image forming apparatus system for selectively forming images on the basis of binary image data or multiple image data, and in particular, the present invention is directed to an image forming apparatus system preferably applied to an electrophotographic type optical printer such as a laser printer, a digital copying machine, a plain paper copier, a plain paper facsimile device, etc.

2. Description of the Background Art:

Generally, two types of image transmitting methods (1) and (2) as described below are used with respect to an image forming apparatus for forming an image by selectively transmitting binary image data and multiple image data from a LD (laser diode) writing-in control section to a LD control section.

(1) Method—1

The first method of transmitting image data is one in which a multiple value image data bus is employed. Furthermore, the first method utilizes only a transmission control system of clock synchronization by use of a clock signal in synchronism with image data on the multiple value image data bus.

As an example, a case of employing an 8-bit multiple image data bus ("00H": all lights, put out (off) . . . all "white"; "FFH": all lights, lighted up . . . all "black"; "01H"—"FEH": lighting up for halftone) is now explained. When the image data is multiple value data, the 256 values of "00H"—"FFH" are transmitted, as data, in synchronism with a clock. On the other hand, when the image data is binary value data, a white dot and a black dot are respectively transmitted as "00H" and "FFH" in a state of imaginary (dummy) multiple value data in synchronism with the clock.

(2) Method—2

The second method of transmitting image data is one in which a binary value image data bus is employed. Furthermore, the second method utilizes only the other transmission control system of clock synchronism not using the clock signal in synchronism with the image data on the binary value image data bus.

In a case that the image data is multiple value data, the respective dots are transmitted in a one-dot period with PWM (Pulse Width Modulation). On the other hand, in a case that the image data is binary value data, the white dots and the black dots are respectively transmitted on conditions of "all intervals, high level" and "all intervals, low level".

However, in a background digital copying machine or data complex machine, the type of image data to be processed at a time of writing data by the LD (laser diode) differs in each respective printing job. As an example, a case may arise of handling multiple value image data transmitted from a scanner after handling binary value image data from an application of a print controller or the like, or a case of the operations in reverse order may arise. As a result, a problem to be solved arises that the above-mentioned two methods (1) and (2) cannot be used widely for various (two, on this occasion) purposes in order to solve the subject matter both for the multiple value image data transmission and for the binary value image data transmission.

Furthermore, there arises another problem to be solved that in the background image forming apparatus of the electrophotographic type the laser diode is lit up outside of an image effective area in order to obtain a main scanning synchronization signal, and the output light signal obtained by lighting up the laser diode is detected by a sensor as a main scanning synchronization detecting signal. As a result, a state of the main scanning synchronization detecting signal exerts an adverse influence upon the image to be transmitted at the time of changing over the image data from the multiple value image data to the binary value image data, or vice versa. The above matter is also another problem to be solved.

SUMMARY OF THE INVENTION

The present invention has been made in consideration of the above-mentioned problems in order to improve such various subject matter to be solved.

It is an object of the present invention to overcome and improve the drawbacks in the background art.

It is still another object of the present invention to provide novel image forming apparatus with wide usefulness at a time of selectively transmitting binary value image data and multiple value image data.

It is still another object of the present invention to provide a novel image forming apparatus in which a state of a main scanning synchronization detecting signal does not exert any adverse influence upon an image to be transmitted at a time of changing over transmitting image data from multiple value image data to binary value image data, or vice versa.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is a timing chart showing a relationship of an image data bus selecting signal, multiple value image data, and binary value image data, in an image data bus changing over section as shown in FIG. 3;

FIG. 5 is a timing chart showing a relationship between a synchronization clock control signal and a synchronization clock signal, in a synchronization clock changing over section as shown in FIG. 3;

DETAILED DESCRIPTION OF THE PREFERRED EMBODIMENTS

Figure 1:
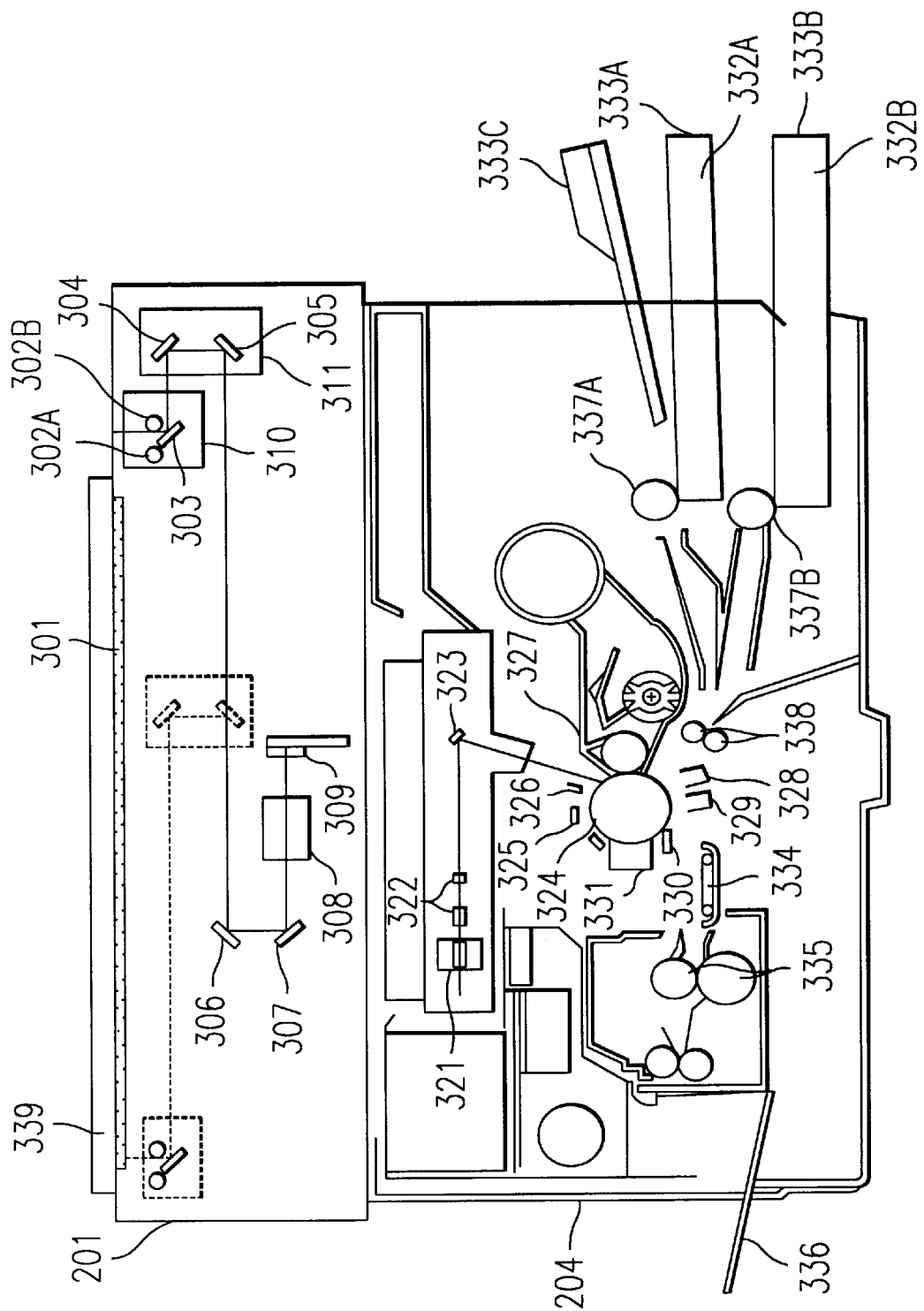
FIG. 1 is a cross-sectional structural view showing a digital copying machine as an embodiment of an image forming apparatus according to the present invention.

An embodiment of the present invention is described hereinafter, referring to the accompanying drawings, wherein like reference numerals designate identical or corresponding parts.

A digital copying machine shown in FIG. 1 is roughly divided into two sections of a scanner section 201 and a printer section 204. Both of these sections form the digital copying machine.

In the scanner section 201, an original document is placed on a contact glass 301 and is pressed by a pressing plate 339. The original document is illuminated by light sources 302a and 302b. The light rays reflected from the original document are reflected in order by mirrors 303 through 307. The light rays thus reflected are focused on the light receiving surface of a CCD image sensor 309 by a lens 308 in order to form an image thereon.

The light sources 302a and 302b and the mirror 303 can be put on a first carriage 310, and the mirrors 304 and 305 can be put on a second carriage 311. The first carriage 310 moves at a speed, and the second carriage 311 moves at one half the speed of the first carriage 310. In such a manner, the original document is scanned in a sub-scanning direction. The scanning of the original document in the main scanning direction is performed by the CCD image sensor 309.

On the whole, the printer section 204 is composed of a laser writing-in section, an image reproducing section, and a paper feeding section. The laser writing-in section includes a laser output unit 321, a focusing lens 322, and a mirror 323. The laser output unit 321 includes a laser diode (LD) for emitting laser light modulated in accordance with image data and a polygon mirror and a motor both for scanning the laser light in the main scanning direction. A latent image is formed on a photosensitive drum 324 of the image reproducing system by the LD light thus modulated.

The photosensitive drum 324 rotates in the clockwise direction. The following elements are formed around the photosensitive drum 324: a charger 325, an eraser 326, the above-mentioned laser writing-in system, a developing unit 327, a transfer charger 328, a separation charger 329, a separation claw 330, and a cleaning unit 331. Furthermore, a beam sensor for detecting the LD light and outputting a main scanning synchronization detecting signal (/DETP) mentioned later is disposed at a side edge of the photosensitive drum 324, although the beam sensor is not shown in FIG. 1.

To state briefly the process of the image reproducing system, initially the surface of the photosensitive drum 324 is uniformly charged by the charger 325. In such a state, the laser light is radiated onto the surface of the photosensitive drum 324, and the electric potential on the area thus radiated is lowered. The laser light is respectively turned on and off corresponding to black and white of image data.

Consequently, the potential distribution, that is, the electrostatic latent image corresponding to the black and white of the image data, is formed on the surface of the photosensitive drum 324. Next, when the area having the electrostatic latent image formed thereon passes through the developing unit 327, toner is attached onto the surface of the photosensitive drum 329 in accordance with the level of the electric potential distribution, and thereby a toner image is formed on the area attached with the toner. The toner image thus formed is transferred onto a recording sheet by the transfer charger 328. Next, the recording sheet is separated from the photosensitive drum 324 by the separation charger 329 and the separation claw 330. Thereafter, the surface of the photosensitive drum 324 is cleaned by the cleaning unit 331.

The paper feeding system can include two system paper feeding cassettes 333a and 333b and a manual handling paper feeder 333c. The recording sheets 332a set on the upper-stage paper feeding cassette 333a and the manual handling paper feeder 333c are feed by a paper feeding roller 337a. On the other hand, the recording sheets 332b set on the lower-stage paper feeding cassette 333b are fed by another paper feeding roller 337b. A recording sheet 332 fed in such a manner is brought into direct contact with a registration roller 338 and is stopped temporarily thereon. Thereafter, the recording sheet is transported so as to coincide with the toner image formed on the photosensitive drum 324.

When the toner image is transferred onto the recording sheet 332 as mentioned above, the recording sheet 332 is transported by a transport belt 334, and the toner image on the recording sheet 332 is fixed by a pair of fixing rollers 335. Next, the image-fixed recording sheet is discharged onto a paper discharging tray 336.

Figure 2:
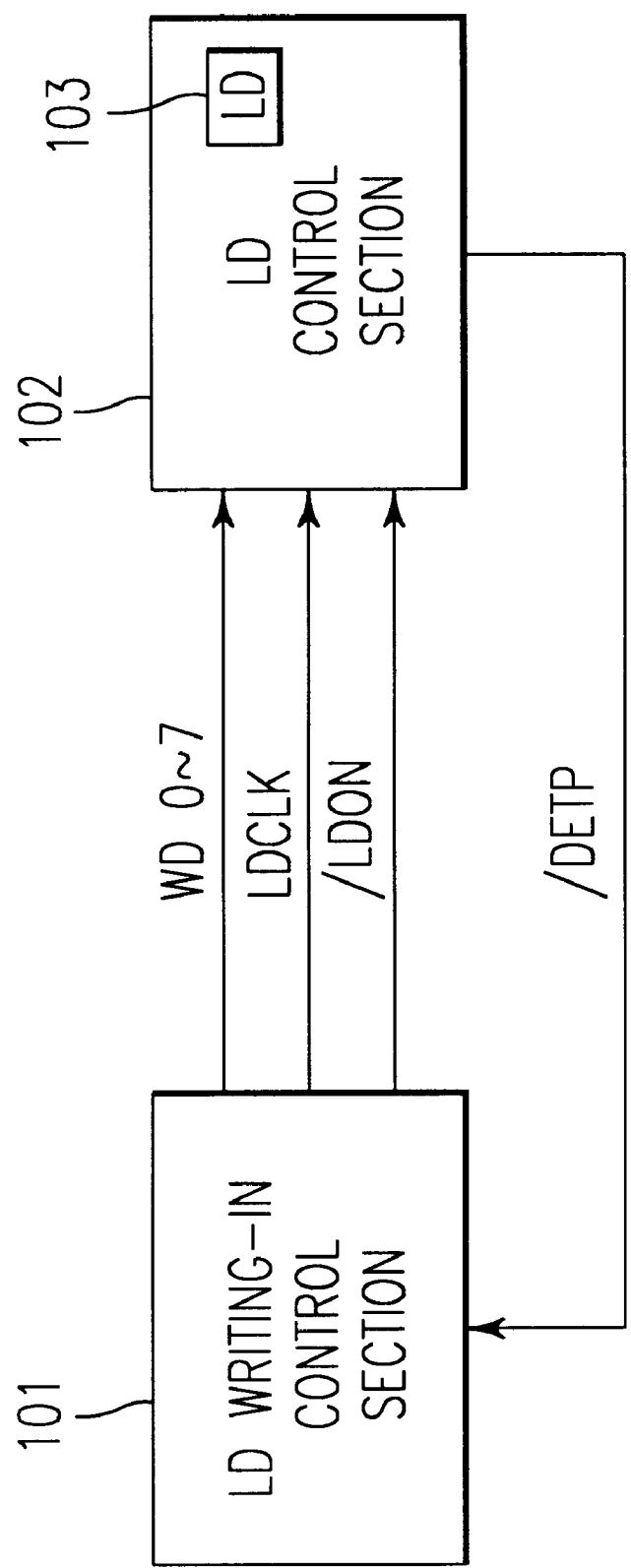
FIG. 2 is a block diagram showing a LD writing-in control section and a LD control section, both of which are parts of the image forming apparatus according to the present invention.

In FIG. 2, a LD writing-in control section 101 and a LD control section 102 are connected to each other through two systems of image data buses, which are an 8-bit multiple value image data bus WD 0-7 and a 1-bit binary value image data bus (/LDON). Furthermore, a synchronization clock LDCLK is applied to the LD control section 102 from the LD writing-in control section, and a main scanning synchronization detecting signal (/DETP) is applied to the LD writing-in control section 101 from the LD control section 102. LD 103 in the LD control section 102 is turned on (lit up) in accordance with the signals on the multiple value image data bus WD 0-7 and the binary value image data bus (/LDON) transmitted from the LD writing-in control section 101.

Figure 3:
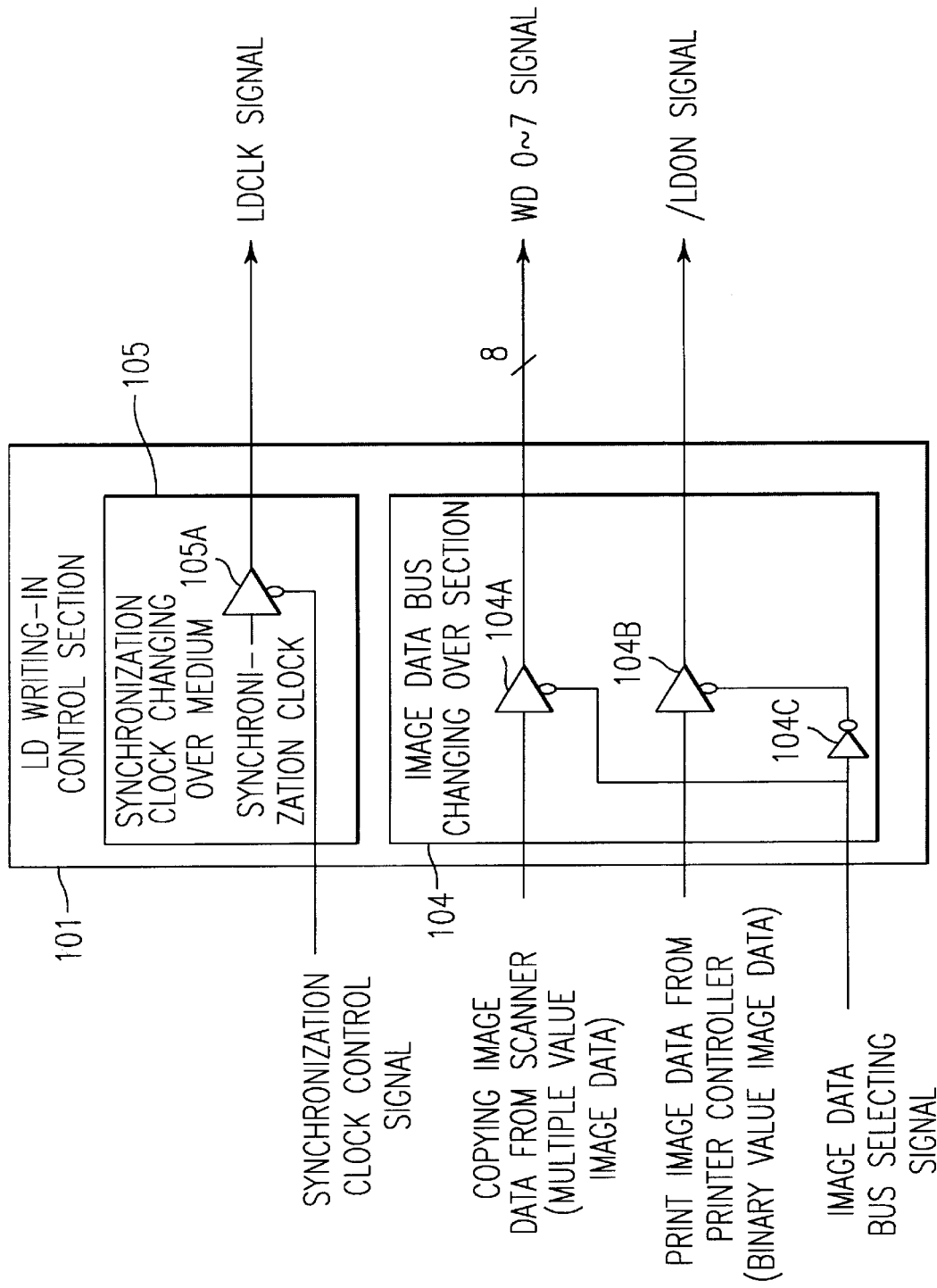
FIG. 3 is a block diagram further showing in detail the LD writing-in control section of FIG. 2.

As shown in FIG. 3 in more detail, the LD writing-in control section 101 includes an image data bus changing over section 104 for selecting the multiple value image data bus WD 0-7 at a time of outputting multiple value image data, and for selecting the binary value image data bus (/LDON) at a time of outputting binary value image data on the basis of an image data bus selecting signal. LD writing-in control section 101 also includes a synchronization clock changing over section 105 for putting the synchronization clock LDCLK in a transmitting state at a time of outputting the multiple value image data, and for putting the synchronization clock LDCLK in a stopping state at a time of outputting the binary value image data on the basis of a synchronization clock control signal.

The image data bus changing over section 104 includes two three-state buffers 104a and 104b and an inverter 104c. As shown in FIG. 4, when the image data bus selecting signal is at a logical low level, the data on the multiple value image data bus WD 0-7 becomes effective, and at the same time the signal on the binary value image data bus (/LDON), which is the output signal of the three-state buffer 104*b*, turns out to be at a logical high level. On the other hand, when the data bus selecting signal is at a logical high level, the data on the binary value image data bus (/LDON) becomes effective, and at the same time the signal on the multiple value image data bus WD 0-7, which is the output signal of the three-state buffer 104*a*, turns out to be in a state of high impedance.

Furthermore, the synchronization clock changing over section 105 includes a three-state buffer 105*a*. As shown in FIG. 5, when the synchronization clock control signal is at a logical low level the synchronization clock LDCLK, which is the output signal of the three-state buffer 105*a*, becomes effective. On the other hand, when the synchronization clock control signal is at a logical high level, the output signal of the three-state buffer 105*a* turns out to be in a state of high impedance.

Figure 6:
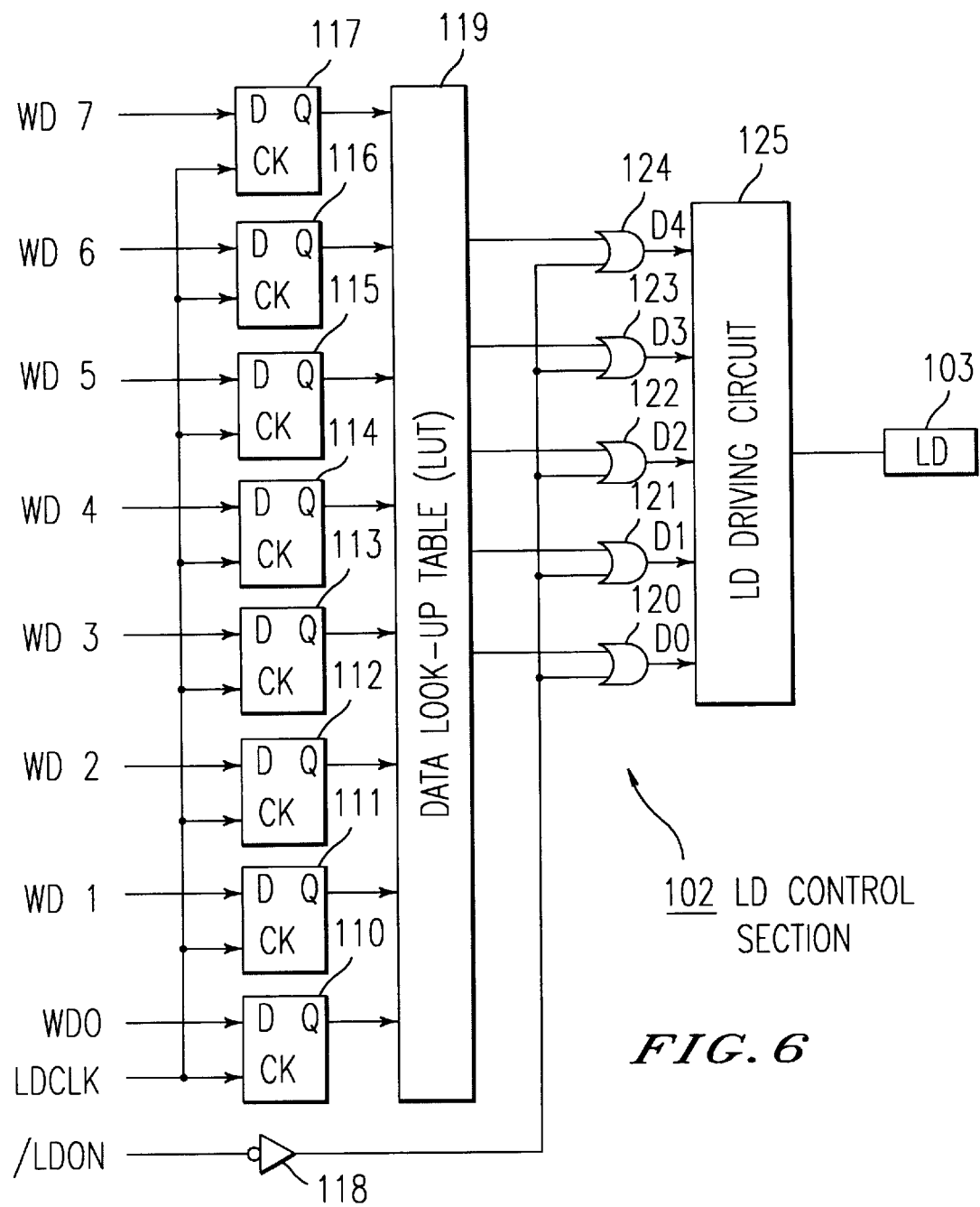
FIG. 6 is a block diagram showing, in detail, the LD control section shown in FIG. 2.

In the LD control section 102, as shown in FIG. 6 in detail, the multiple value image data WD 7-0 are respectively applied to the respective D terminals of D flip flops 117–110 and the synchronization clock LDCLK is commonly applied to the respective clock terminals CK thereof. The signal on the binary value image data bus (/LDON) is applied to an inverter 118. A data look-up table (LUT) 119 converts the input signal to a 5-bit PWM drive signal on the basis of respective Q outputs of the D flip flops 117–110 and the respective bits are output to respective first input terminals of OR gates 124–120.

Figures 7, 9:
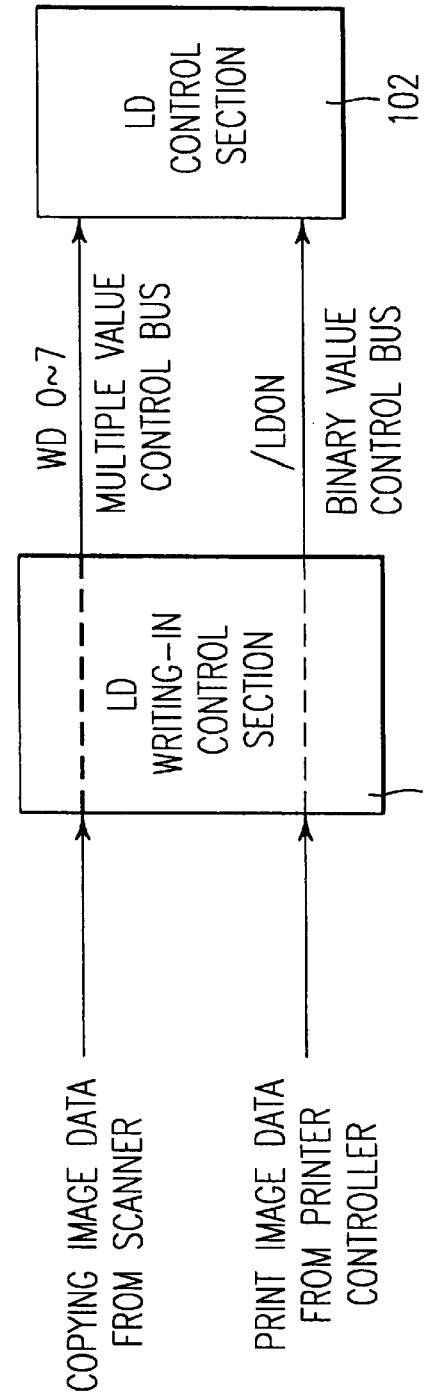
FIG. 7 is an explanatory diagram explaining the LD driving signal in the LD control section shown in FIG. 6.
FIG. 9 is a block diagram for explaining an operation of changing over the LD writing-in control section shown in FIG. 2.

On the other hand, the output signal of the inverter 118 is commonly applied to second input terminals of the OR gates 124–120. The 5-bit PWM drive signals D4–D0 as shown in FIG. 7 are applied to a LD drive circuit 125 from the OR gates 124–120. The LD drive circuit 125 drives the LD 103 on the basis of the PWM drive signals D4–D0.

Figure 8:
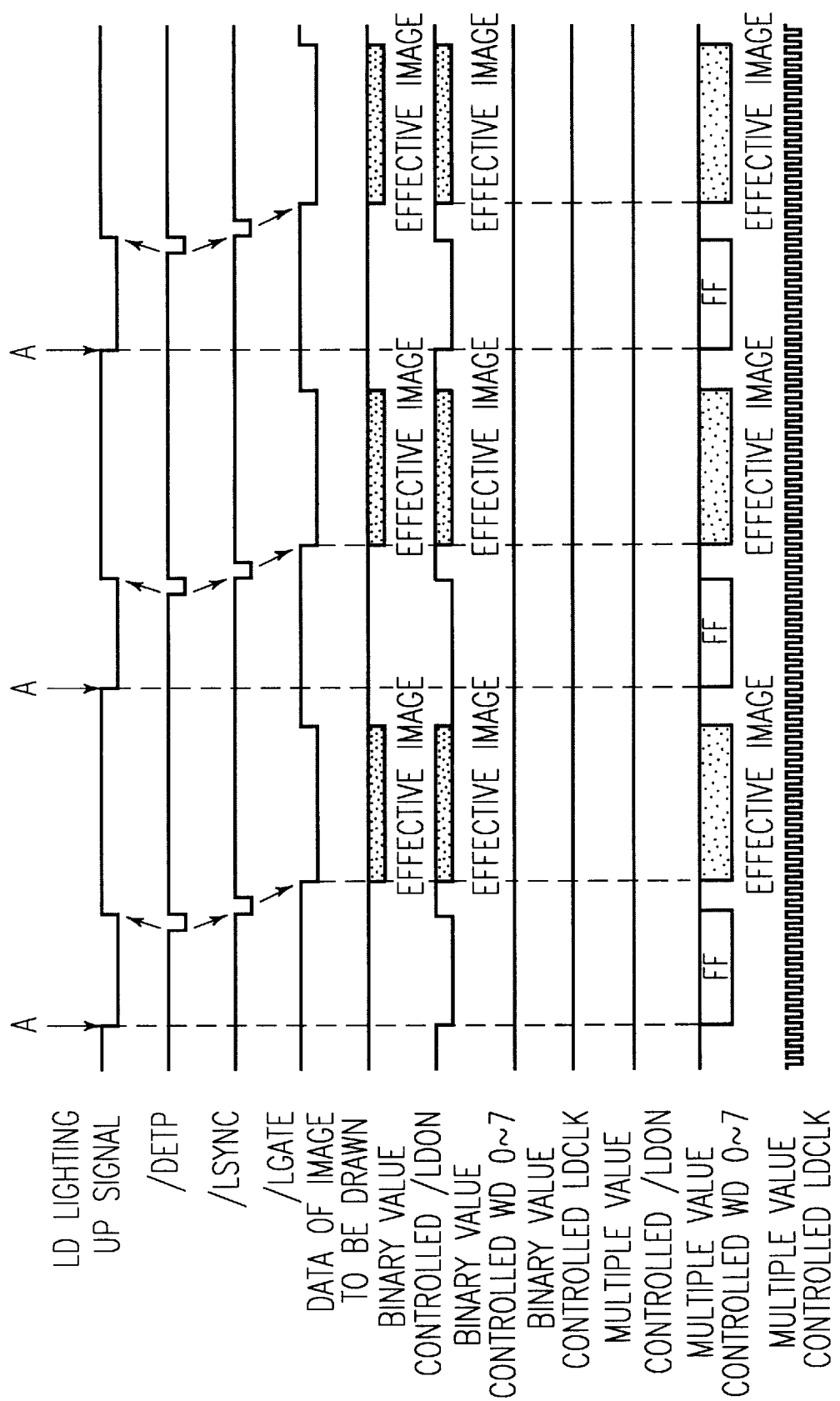
FIG. 8 is a timing chart showing the main signals in the LD writing-in control section and the LD control section.

As shown in FIG. 8, the LD writing-in control section 101 outputs a LD lighting up signal at a timing A on the binary value image data bus (/LDON) in order to obtain a main scanning synchronization detecting signal (/DETP) for performing the image writing-in by use of the LD 103. When the LD control section 102 lights up the LD 103 by the action of the LD lighting up signal, the laser light is detected by a beam sensor and the main scanning synchronization detecting signal (/DETP) is fed back to the LD writing-in control section 101 from the LD control section 102. The LD control section 102 negates the LD lighting up signal by the action of the main scanning synchronization detecting signal (/DETP).

The LD control section 102 generates a main scanning synchronization signal (/LSYNC) and a main scanning image area effective signal (/LGATE) by the action of the main scanning synchronization detecting signal (/DETP). The main scanning image area effective signal (/LGATE) outputs the multiple value image data or binary value image data at an asserting time thereof.

In a case of outputting the binary value image data, the LD writing-in control section 101 selects the binary value image data bus (/LDON). The LD writing-in control section 101 asserts the LD lighting up signal at the timing A as shown in FIG. 8 on the binary value image data bus (/LDON). Next, when the LD writing-in control section 101 receives the main scanning synchronization detecting signal (/DETP), the LD writing-in control section 101 turns off the LD lighting up signal and outputs the binary value of the image data at an asserting time of the main scanning image area effective signal (/LGATE).

On the other hand, in a case of outputting the multiple value image data, the LD writing-in control section 101 selects firstly the binary value image data bus (/LDON) as shown in FIG. 8 and outputs the LD lighting up signal with the timing as shown in FIG. 8. Next, when the LD writing-in control section 101 receives the main scanning synchronization detecting signal (/DETP), the LD writing-in control section 101 turns off the LD lighting up signal. Next, the LD writing-in control section 101 selects the multiple value image data WD 0-7, and at the same time outputs the multiple value image data in synchronism with the synchronization clock LDCLK at the asserting time of the main scanning image area effective signal (/LGATE) on the multiple value image data bus WD 0-7 in the state of turning on the synchronization clock LDCLK.

Consequently, as shown in FIG. 9, regarding image data to be recorded on an effective image area, it is possible to cope with a case in which there exists two types of image data, namely, multiple value image data read out by the scanner section 201 and binary value image data transferred from a host computer, etc.

Figure 10:
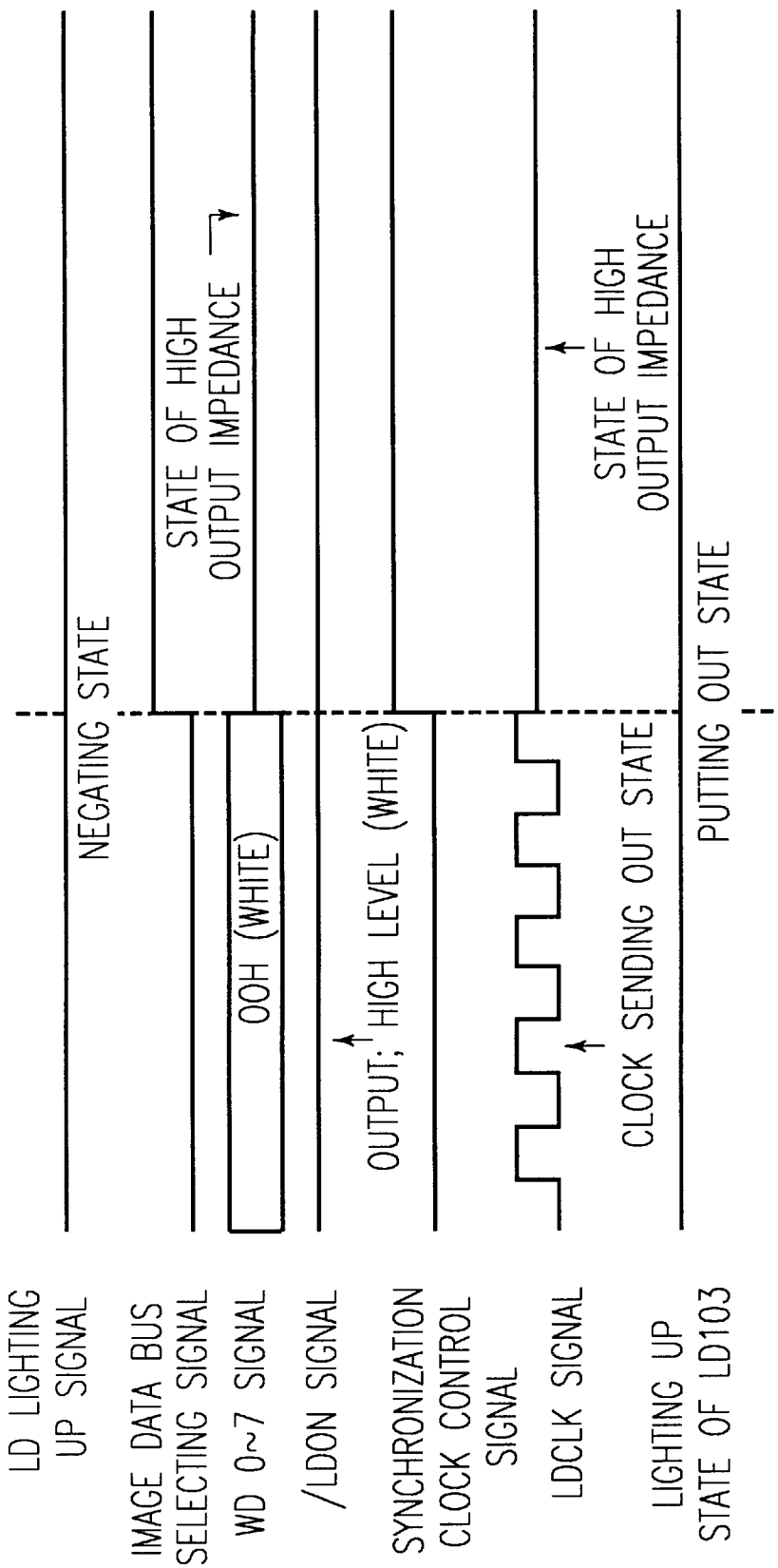
FIG. 10 is a timing chart showing main signals in a case of changing over image data from multiple value image data to binary value image data.
Figure 11:
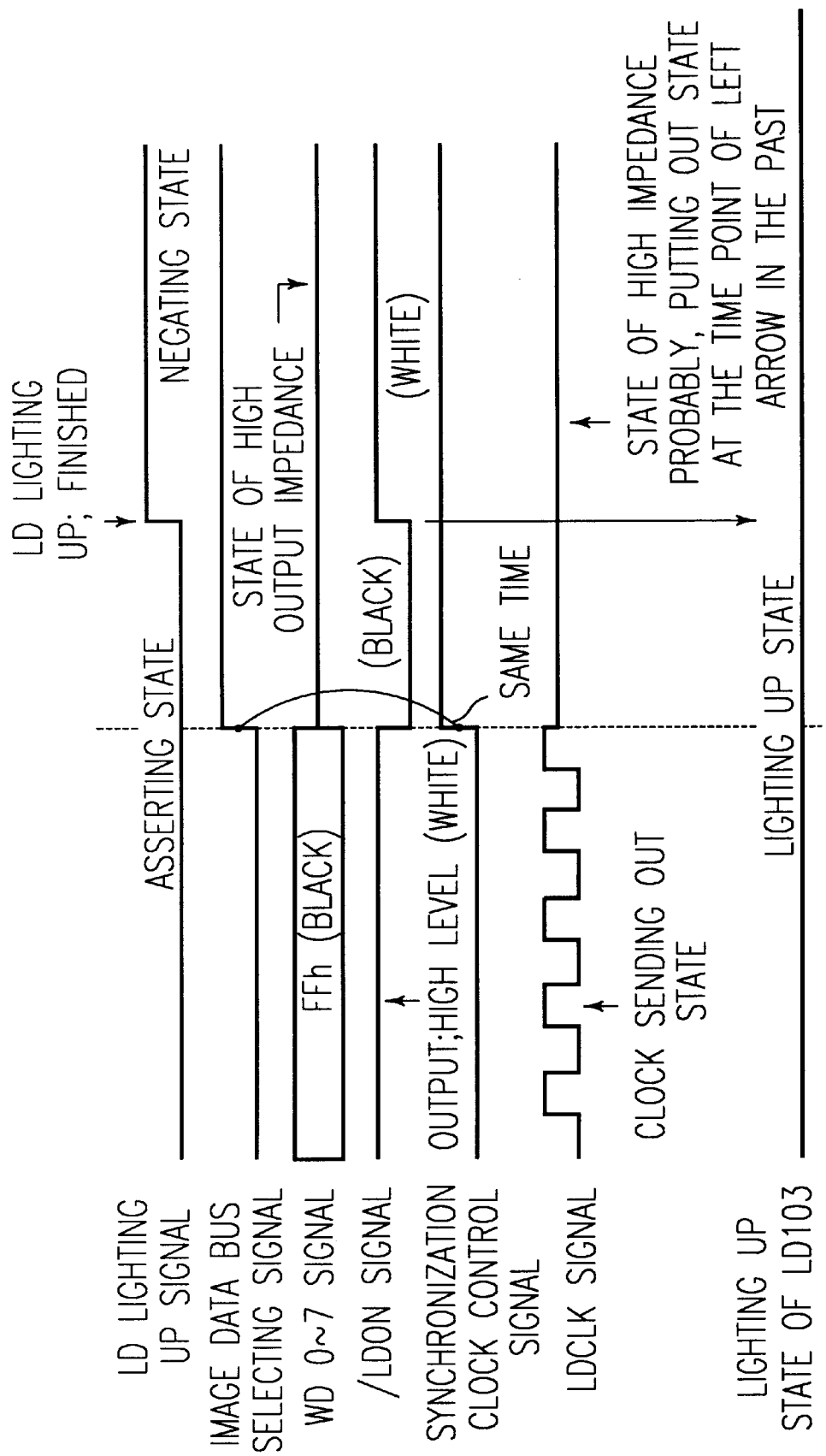
FIG. 11 is a further timing chart showing main signals in a case of changing over image data from multiple value image data to binary value image data.
Figure 12:
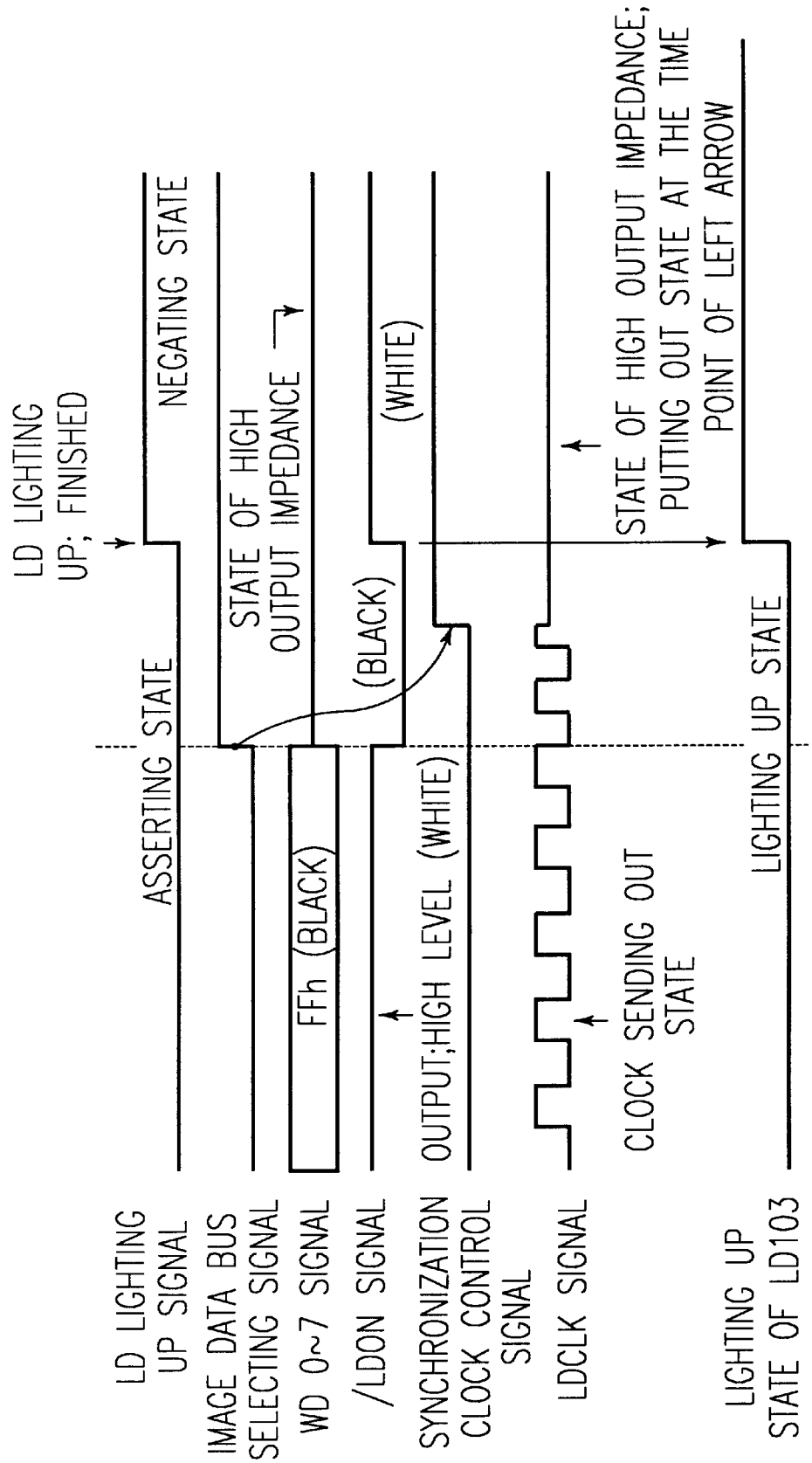
FIG. 12 is a further timing chart showing main signals in a case of changing over image data from multiple value image data to binary value image data.

Next, an operation at a time of changing over the image data from the multiple value image data to the binary value setting data is explained, referring to FIG. 10 through FIG. 12. FIG. 10 shows a state in which the image data bus selecting signal and the synchronization clock control signal are changed over at a same time from the logical low level to the logical high level when the LD lighting up signal for obtaining the main scanning synchronization detecting signal (/DETP) is put in the negating state.

Here, since the signal line relating to the changing over control directly processes the signal in connection with lighting up/putting out the LD 103 in LD control section 102, if the copying machine side performs the operation of changing over during the time period of writing in on the effective image area, the operation exerts an adverse influence on the image to be recorded. Therefore, an unfavorable phenomena may likely occur in which the image partially disappears or another abnormal state of the image may occur. For this reason, the changing over operation is not performed during the time period of writing in on the effective image area. Instead, the changing over operation is performed in a time period between adjacent recording papers not performing the writing-in operation by the LD 103 or in a time period between print jobs.

For instance, in a case of receiving a command of alternately and successively processing page by page a copying image (multiple value image data) and a printer image (binary value image data) as printing commands for the copying machine, the image data bus is changed over page by page so as to change the mode from multiple value→binary value→multiple value→binary value→ . . . etc.

Here, in the case of successively performing the operation of recording the image on the recording paper as the recording by the image forming apparatus for performing particularly a high-speed printing operation, the rotation of the polygon motor is not stopped in order to continue the high-speed printing operation, and outputting of the LD lighting up signal is also not stopped in order to obtain the main scanning synchronization detecting signal (/DETP), even during the time period between adjacent recording papers or between print jobs. There also exists a probability that the timing of changing over the image data to be printed from the multiple value image data to the binary value image data will fall on the time period of outputting the LD lighting up signal (/DETP).

FIG. 11 shows that the image data bus selecting signal and the synchronization clock control signal are changed over from the logical low level to the logical high level at a same time during a time period the LD lighting up signal is in an asserted state. In FIG. 10, both of the multiple value image data and the binary value image data process white image data before and after changing over the image data bus, and the state of putting out the LD 103 is continued, and thereby the normal operation can be ensured. On the contrary, in FIG. 11, since the LD lighting up signal is put in the asserting state at a time of changing over the image data bus, both of the multiple value image data and the binary value image data process black image data, and therefore the LD 103 is put in the lighting up state before and after changing over the image data bus.

Here, in the control operation as shown in FIG. 11, one noteworthy important point is that, regarding the operation of the LD writing-in control section 101, the image data are sent out to the LD control section 102 so as not to change the asserting state of the LD lighting up signal.

However, as shown in the lower portion of FIG. 11, regarding the lighting up stage of the LD 103 corresponding to the image data transmission from the LD writing-in control section 101, after changing over the image data to be printed from the multiple value image data to the binary value image data, the LD 103 is kept in the lighting up state ever after changing over the binary value image data (/LDON) from the logical low level (=lighting up state) to the logical high level (=putting out state). Consequently, the operation turns out to be different from that of the image data from the LD writing-in control section 101.

The reason for this is that, since the aforementioned image data bus selecting signal and synchronization clock control signal are changed over from the logical low level to the logical high level at the same time, the binary value image data (/LDON) is selected instead of the multiple value image data WD 0-7, and at the same time the clock signal LDCLK in synchronism with the multiple value image data WD 0-7 is put in the stopping state.

Consequently, regarding the operation of the LD control section 102 shown in FIG. 6, the LD lighting up signal for obtaining the main scanning synchronization detecting signal (/DETP) is changed over at a time in the asserting state.

Furthermore, since the signals WD 0-7 on the multiple value image data bus immediately before the changing-over of the signal are signals at the time when all of the LD 103 are put in the lighting up state (for instance, all of the signals WD 0-7 are at a logical high level), even regarding the data keeping of the data look-up table (LUT) 119 in LD writing-in section 102, the state that all of the LD 103 are lit up by the multiple value image date ED 0-7 turns out to be kept by the action of the clock signal LDCLK immediately before the changing-over of the image data bus.

Next, after changing over the image data bus, regarding the data transmission control to the LD control section 102 as mentioned before, the signal (/LDON) becomes effective and at the same time the multiple value image data WD 0-7 are put in the high impedance state. The data transmission control is changed over to the logical low level fixing state showing the state of putting out the LD 103 by the action of the circuit construction of the LD control section 102.

However, immediately at the time of the changing-over, the clock signal LDCLK in synchronism with the multiple value image data WD 0-7 is put also in the stopping state. Consequently, regarding the data holding of the data look-up table 119 of the LD writing-in section 102, the state that all of the LD 103 are put out by the action of the multiple value image data WD 0-7 cannot be held, and thereby the state that all of the LD 103 are put out which is held by the clock signal LDCLK immediately before the changing over thereof turns out to be continuously held.

And then, once again, in synchronism with the clock signal LDCLK, all of the LD 103 are kept in the lighting-up state until the multiple value image data bus transfers the data showing the state that all of the LD 013 are putting out from the LD writing-in section 102 to the LD control section 102. In such a situation, even though the mode of the binary value image data is selected and the operation of lighting up/putting out the LD 103 is performed by the action of the signal (/LDON), a troublesome matter may arise that the output image turns out to be an all-black printing image as the result of keeping the state that all of the LD 103 are lit up.

In order to solve the above-mentioned troublesome matter, the control operation is illustrated in FIG. 12 is performed according to the present invention. The operation of FIG. 12 differs from that of FIG. 11. In FIG. 12, the image data bus selecting signal and the synchronization clock control signal are not changed over at the same time from the logical low level to the logical high level. Instead, the image data bus selecting signal is first changed over from the logical low level to the logical high level, and thereafter the synchronization clock control signal is changed over from the logical low level to the logical high level.

As to the operation of the LD control section 102 illustrated in FIG. 6, since the LD lighting up signal is changed over during the time period of asserting, the signals WD 0-7 on the multiple value image data bus immediately before the changing-over of the image data bus are data showing the state that all of the LD 103 are lit up (for instance, all of the signals WD 0-7 are put in the logical high level state), and although the operational state until the time immediately before the changing-over of the image data bus is the same as that shown in FIG. 11, the data transmission control to the LD control section 102 turns out to be the state that the signal (/LDON) is effective immediately after the changing-over of the image data bus, and the signals WD 0-7 are put in the state of high impedance.

As a result, even though the data transmission control is changed over to the logical low level fixing state showing the state of putting out the LD 103 by the action of the circuit construction of LD control section 102, immediately at the time of the changing-over, the clock signal LDCLK in synchronism with the multiple value image data WD 0-7 is not put in the stopping state. Therefore, as to the holding of the data in the data look-up table (LUT) 119, the logical low level showing the state that all of the LD 103 are put out turns out to be kept by the action of the signals WD 0-7. Consequently, the data showing the state that all of the LD 103 are lit up, which is kept by the clock signal LDCLK immediately before the changing-over, cannot be continuously kept. Thereafter, the print mode of the binary value image data is selected and the operation of the lighting-up/putting-out of the LD 103 are correctly reflected on the print image. This operation shows a preferable state and which avoids any troublesome matter.

Figure 13:
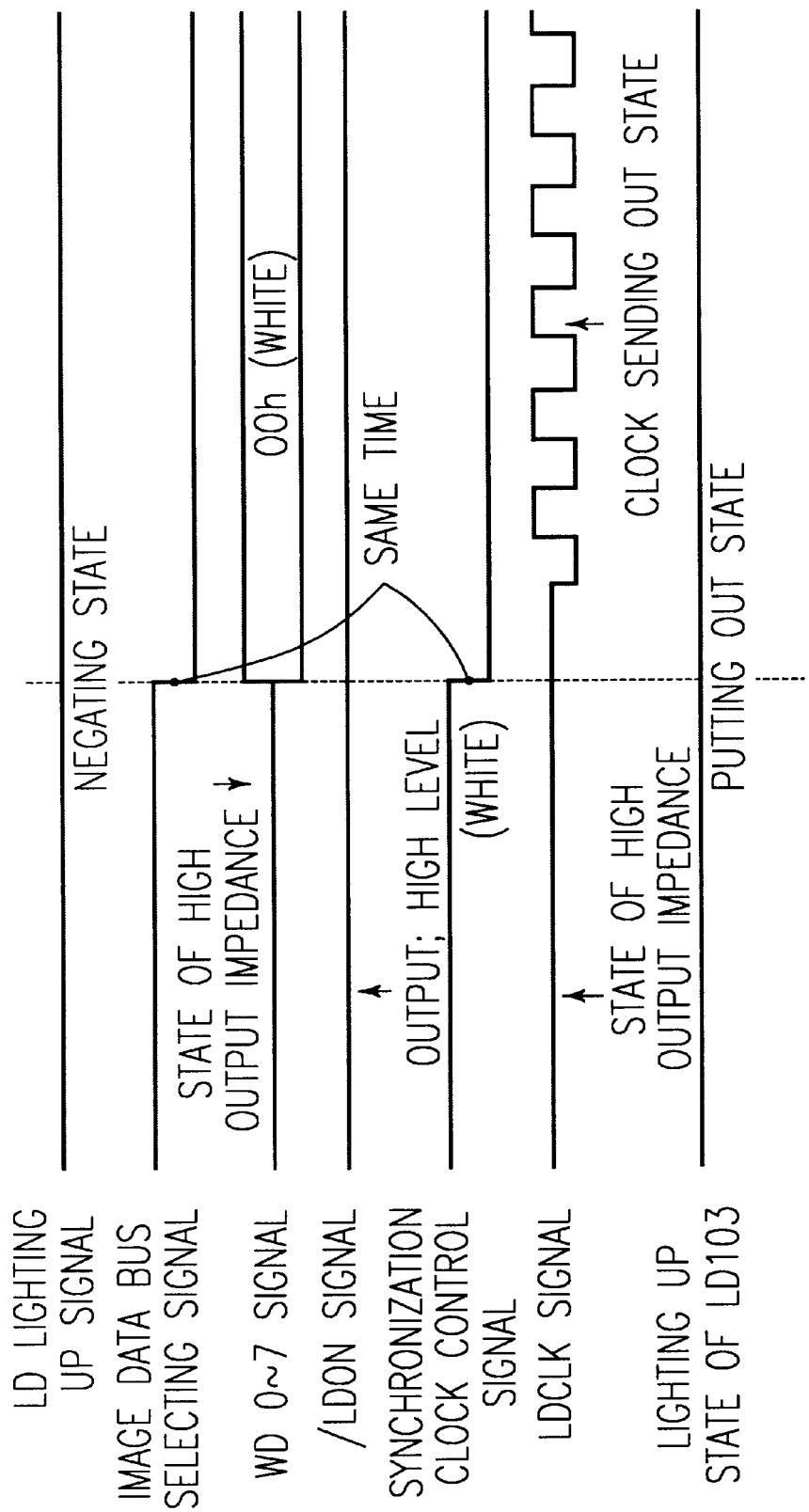
FIG. 13 is a further timing chart showing main signals in a case of changing over image data from binary value image data to multiple value image data.

Next, referring to FIGS. 13 through 15, an operation at a time of changing over the image data from the binary value image data to multiple value image data is explained hereinafter. FIG. 13 illustrates that, when the LD lighting up signal for obtaining the main scanning synchronization detecting signal (/DETP) is put in the negating state, the image data bus selecting signal and the synchronization clock control signal are changed over from the logical high level to the logical low level at the same time. Even on this occasion, there is a probability that the timing of changing over the image data to be printed from the multiple value image data to the binary value image data falls on the time period of asserting the LD lighting up signal for obtaining the main scanning synchronization detecting signal (/DETP).

Figure 14:
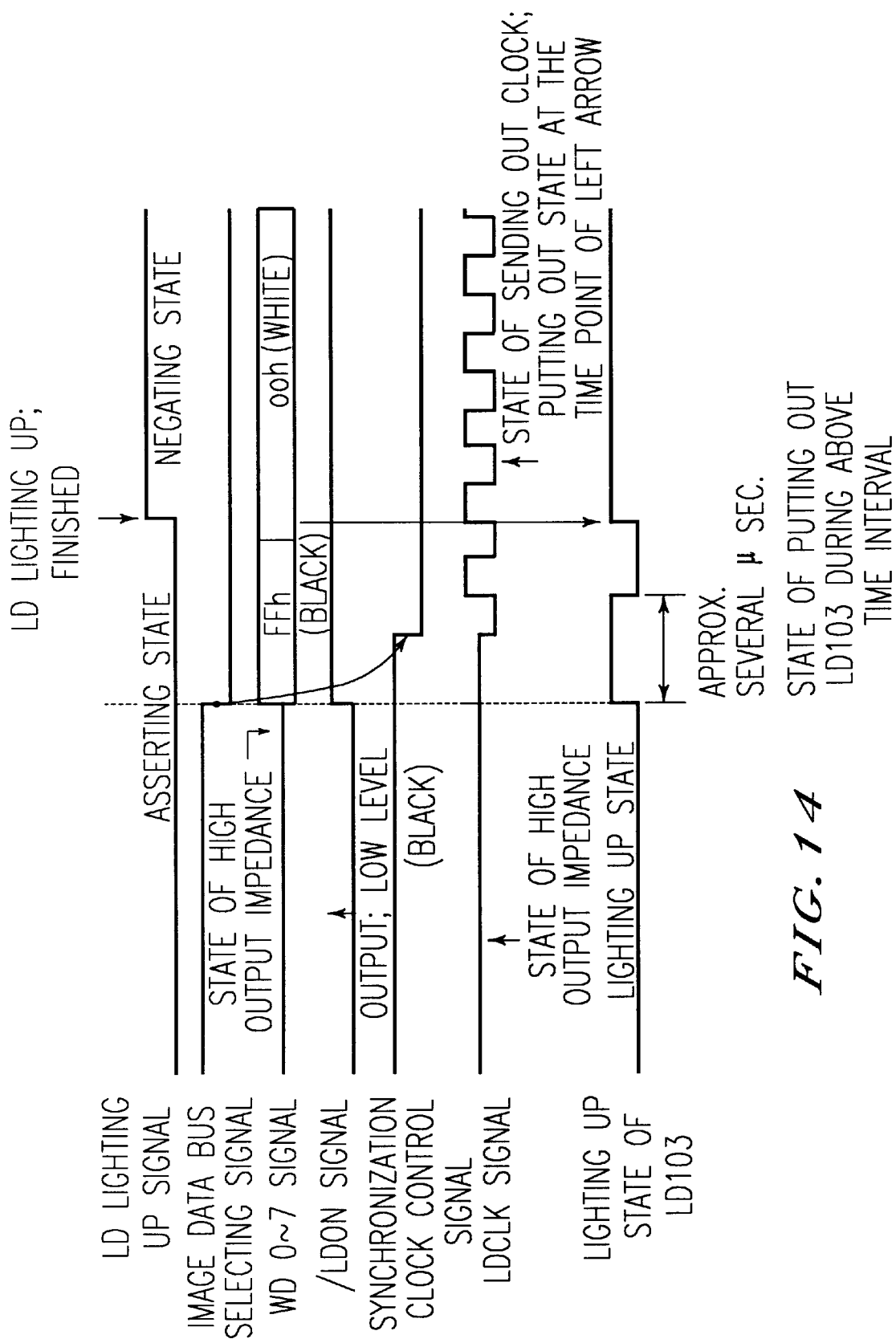
FIG. 14 is a further timing chart showing main signals in a case of changing over image data from binary value image data to multiple value image data.
Figure 15:
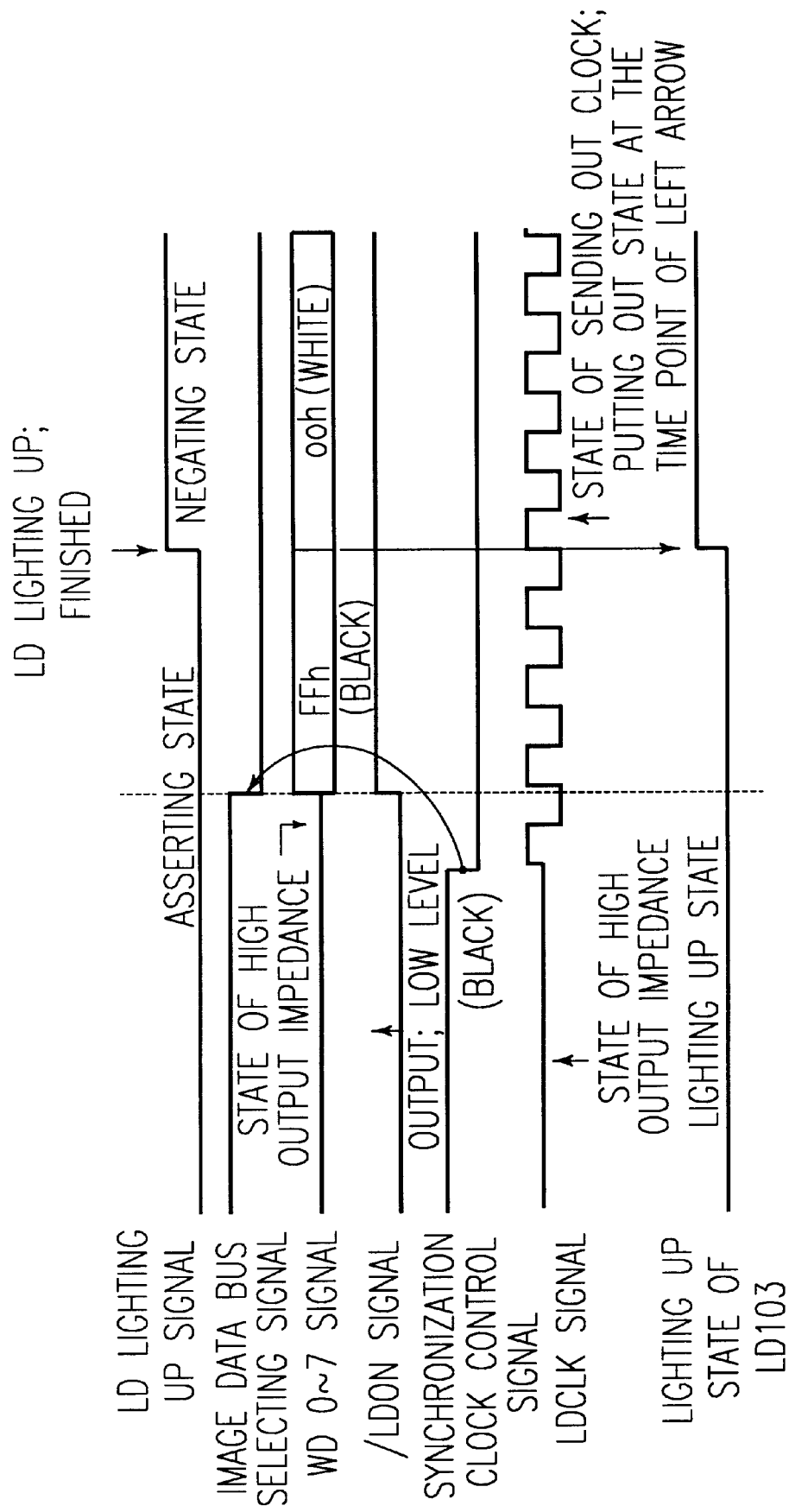
FIG. 15 is a further timing chart showing main signals in a case of changing over image data from binary value image data to multiple value image data.

The operation of FIG. 14 differs from that of FIG. 13. Namely, the operation of FIG. 14 shows that during the time period of asserting the LD lighting up signal for obtaining the main scanning synchronization detecting signal (/DETP), the synchronization clock control signal is changed over after the image data bus selecting signal. In FIG. 13, the multiple value image data and the binary value image data process together the white image data "00h" before and after the changing over of the image data bus, and the LD 103 continues in the putting-out state and operates normally.

On the other hand, since the LD lighting up signal is put in the asserting state at the time of changing over the image data bus as shown in FIG. 14, the multiple value image data and the binary value image data are together black image data and the LD 103 is put in the lighting up state before and after the changing-over.

Here, one noteworthy point is that when the control operation as shown in FIG. 14 is performed, the asserting state of the LD lighting up signal is changed as the operation of the LD writing-in control section 101, and the transmission of the data to the LD control section 102 cannot be performed correctly. Thereby, the LD 103 corresponding to the transmission of the image from the LD writing-in control section 101 is put in the putting out state until the first signal of the image data bus signals (multiple value image data WD 0-7) is kept by the LD control section 102 on the basis of the clock signal LDCLK after changing over the image data to be printed from the binary value image data to the multiple value image data. As a result, the lighting-up state cannot be maintained.

Furthermore, in the time period until the first signal of the image data bus signals WD 0-7 after the changing-over of the image data bus are kept by the LD control section 102 on the basis of the clock LDCLK, the operation of changing over the mode is not synchronized with the clock signal LDCLK. Moreover, in a case of performing the control operation by the use of software or the like, since there is a high probability that a time difference occurs between the image data bus selecting signal and the synchronization clock control signal, there is a probability that a period of several seconds arises during which the lighting-up state of the LD 103 cannot be maintained during the asserting state of the LD lighting up signal.

Furthermore, when the synchronization clock control signal is changed over from the logical high level to the logical low level after changing over the image data bus selecting signal from the logical high level to the logical low level, even though the signals of the image data bus WD 0-7 are selected from the binary value image data (/LDON), the clock signal LDCLK synchronized with the image data bus signals WD 0-7 is put in the stopping state.

Consequently, as to the operation of the LD control section 102, since the changing over operation thereof is performed when the LD lighting up signal is put in the asserting state, the binary value image data (/LDON) immediately before the changing-over of the image data bus are the data at the time of lighting up all of the LD 103 (i.e., when the signal (/LDON) is at a logical low-level signal).

Regarding the data holding for the data in the data look-up table (LUT) 119 of the LD control section 102 immediately before the changing-over of the image data bus, if a picture drawing is normally performed by use of the binary value image data, the putting-out state of all of the LD 103 is held by the action of the signals WD 0-7.

Next, immediately after the changing-over thereof, as a result of the data transmission control to the LD control section 102, the signals WD 0-7 become effective and the signal (/LDON) is put in the state of high impedance as mentioned before. As a result, the circuit construction in the LD control section 102 changes over the state to the logical high-level fixing state showing the LD putting-out state. However, since the clock signal LDCLK in synchronism with the signals WD 0-7 is put in the stopping state at the time of changing-over thereof, regarding the data holding for the data in the data look-up table (LUT) 119, the logical low level showing the putting-out state of all of the LD 103 is held by the action of the signals WD 0-7.

Consequently, as mentioned in the above explanation, in the time period after the signal (/LDON) at the time the changing-over becomes ineffective in relation to the lightingup/putting-out control of the LD 103 until the data in the data look-up table (LUT) 119 of the signals WD 0-7 showing the state of lighting up all of the LD 013 by use of the clock signal LDCLK is held, the data for putting out of the LD control section 102 do not exist in either one of the multiple and binary value control signals in the LD control section 102. The clock signal LDCLK is put in the transmitting state from the LD writing-in control section 101 to the LD control section 102 by the action of the synchronization clock control signal.

Consequently, all of the LD 103 are put in the state of being put out until the multiple value image data bus WD 0-7 holds the data showing the lighting-up of all of the LD 103 in synchronism with the first clock LDCLK. Therefore, the asserting state of the LD lighting up signal cannot be maintained and thereby the state turns out to be a negating state.

For this reason, in a case that, for instance, a first one picture element (pixel) immediately after the changing-over thereof is a last one pixel in the asserting state of the LD lighting up signal, there arises a probability that the lighting up of the LD 103 is not detected by the main scanning synchronization detecting sensor, and thereby a synchronization detecting error may occur. Consequently, a troublesome matter may occur in the operation of forming the image.

In such a situation, the synchronization clock control signal is not changed over from the logical high level to the logical low level after changing over the image data bus selecting signal from the logical high level to the logical low level as shown in FIG. 14. Instead, as shown in FIG. 15, the image data bus selecting signal is changed over from the logical high level to the logical low level after changing over the synchronization clock control signal from the logical high level to the logical low level.

To explain concretely the operation of the LD control section 102 performed by such a changing-over, in a case that the LD lighting up signal is changed over in the asserting state, the binary value image data (/LDON) immediately before the changing-over is data at a time of lighting up all of the LD 103 (i.e., when the signal (/LDON) is put in the logical low level state), and the lighting up state of the LD 103 until the time point immediately before the changing-over is the same as that shown in FIG. 14.

However, in accordance with the operation of changing over by the image data bus selecting signal, the control of transmitting the data to the LD control section 102 turns out to be in a state that the signals WD 0-7 are effective. Furthermore, the clock signal LDCLK in synchronism with the signals WD 0-7 is put in the sending-out (transmitting) state before the signal (/LDON) becomes ineffective. The data holding in the data looking-up table (LUT) 119 may become possible before the signals WD 0-7 become effective.

Consequently, since the data of the all LD 103 lighting up state held by the clock signal LDCLK immediately after the changing-over of the image data bus can be held, in the case of selecting the print mode by the action of the multiple image data, the control operation of lighting up and putting out the LD 103 can be normally reflected to the print image. Consequently, there occurs no troublesome matter.

As described heretofore, according to one feature the present invention includes an image data transmitter for transmitting image data, an image data receiver for receiving the image data transmitted by the image transmitter, a multiple value image data bus for transmitting multiple value image data, a binary value image data bus for transmitting binary value image data, and a clock line for transmitting a clock signal in synchronism with the multiple value image data.

The image data transmitter includes an image data bus selecting section for selecting the multiple value image data bus at a time of transmitting the multiple value image data and selecting the binary value image data bus at a time of transmitting the binary value image data. The image data transmitter also includes a synchronization clock changing over section for setting the clock signal to a transmitting state at a time of transmitting the multiple value image data and setting the clock signal to a transmission-stopping state at a time of transmitting the binary value image data.

The multiple value image data bus is selected at the time of transmitting the multiple value image data and at the same time the clock signal is set to the transmitting state. On the other hand, the binary value image data bus is selected at the time of transmitting the binary value image data and at the same time the clock signal is set to the stopping state. Consequently, usage of the apparatus can be improved when the binary value image data and the multiple value image data are selectively transmitted.

As described heretofore, according to a further feature of the present invention, in an image forming apparatus system, when the image data to be transmitted are changed over from the multiple value image data to the binary value image data, the synchronization clock changing over section changes the clock signal setting from the transmitting state to the transmission-stopping state after the image data bus selecting section changes over the image data bus from the multiple value image data bus to the binary value image data bus.

Since the clock signal is changed over from the transmitting state to the stopping state after changing over the image data bus from the multiple value image data bus to the binary value image data bus in a case of changing over the image data to be transmitted from the multiple value image data to the binary value image data, an occurrence of a troublesome matter can be prevented by adopting the structure in which the laser diode is lit up outside of the image effective area and the lit up laser diode is detected by a sensor as the main scanning synchronization detecting signal.

As a further feature of the present invention, in an image forming apparatus system, when the image data to be transmitted are changed over from the binary value image data to the multiple value image data, the image data bus selecting section changes over the image data bus selecting section from selecting the image data bus from the binary value image data bus to the multiple value image data bus after the synchronization clock changing over section changes over the clock signal setting from the transmission-stopping state to the transmitting state.

Since the image data bus is changed over from the binary value image data bus to the multiple value image data bus after changing over the clock signal from the stopping state to the transmitting state in a case of changing over the transmission of the image data from the binary value image data to the multiple value image data, an occurrence of a troublesome matter can be also prevented by adopting a structure in which the laser diode is lit up outside of the image effective area and the lit up laser diode is detected by a sensor as the main scanning synchronization detecting signal.

Obviously, numerous additional modifications and variations of the present invention are possible in light of the above teachings. It is therefore to be understood that within the scope of the appended claims, the present invention may be practiced otherwise than as specifically described herein.

The present application is based on Japanese Priority Document 9-090940, the contents of which are incorporated herein by reference.

What is claimed is:

1. An image forming apparatus system, comprising:
   an image data transmitter transmitting image data and including a multiple value image data bus transmitting multiple value image data and a binary value image data bus transmitting binary value image data;
   an image data receiver receiving the image data transmitted by said image data transmitter;
   a clock line transmitting a clock signal in synchronism with the multiple value image data,
   wherein said image data transmitter and said image data receiver are connected to each other through said multiple value image data bus, said binary image data bus, and said clock line, and
   wherein said image data transmitter includes:
     an image data bus selector selecting said multiple value image data bus at a time of transmitting the multiple value image data and selecting said binary value image data bus at a time of transmitting the binary value image data; and
     a synchronization clock changing over circuit setting the clock signal to a transmitting state at the time of transmitting the multiple value image data and setting the clock signal to a transmission-stopping state at the time of transmitting the binary value image data.

2. The image forming apparatus system as defined in claim 1, wherein said image data transmitter changes over between transmitting the multiple value image data and the binary value image data, and wherein when the image data to be transmitted are changed over from the multiple value image data to the binary value image data, said synchronization clock changing over circuit changes over the clock signal setting from the transmitting state to the transmission-stopping state after said image data bus selector changes selection from said multiple value image data bus to said binary value image data bus.

3. The image forming apparatus system as defined in claim 1, wherein said image data transmitter changes over between transmitting the multiple value image data and the binary value image data, and wherein when the image data to be transmitted are changed over from the binary value image data to the multiple value image data, said image data bus selector changes selection from said binary value data bus to said multiple value image data bus after said synchronization clock changing over circuit changes the clock signal setting from the transmission-stopping state to the transmitting state.

4. The image forming apparatus system as defined in claim 2, wherein said image data transmitter changes over between transmitting the multiple value image data and the binary value image data, and wherein when the image data to be transmitted are changed over from the binary value image data to the multiple value image data, said image data bus selector changes selection from said binary value image data bus to said multiple value image data bus after said synchronization clock changing over circuit changes the clock signal setting from the transmission-stopping state to the transmitting state.

5. An image forming apparatus system, comprising:
an image data transmitting means for transmitting image data and including a multiple value image data bus means for transmitting multiple value image data and a binary value image data bus means for transmitting binary value image data;
an image data receiving means for receiving the image data transmitted by said image transmitter;
a clock transmitting means for transmitting a clock signal in synchronism with the multiple value image data,
wherein said image data transmitting means and said image data receiving means are connected to each other through said multiple value image data bus means, said binary image data bus means, and said clock transmitting means, and
wherein said image data transmitting means includes:
image data bus selector means for selecting said multiple value image data bus means at a time of transmitting the multiple value image data and selecting said binary value image data bus means at a time of transmitting the binary value image data; and
synchronization clock changing over means for setting the clock signal to a transmitting state at the time of transmitting the multiple value image data and setting the clock signal to a transmission-stopping state at the time of transmitting the binary value image data.

6. The image forming apparatus system as defined in claim 5, wherein said image data transmitting means changes over between transmitting the multiple value image data and the binary value image data, and wherein when the image data to be transmitted are changed over from the multiple value image data to the binary value image data, said synchronization clock changing over means changes the clock signal setting from the transmitting state to the transmission-stopping state after said image data bus selecting means changes selection from said multiple value image data bus means to said binary value image data bus means.

7. The image forming apparatus system as defined in claim 5, wherein said image data transmitting means changes over between transmitting the multiple value image data and the binary value image data, and wherein when the image data to be transmitted are changed over from the binary value image data to the multiple value image data, said image data bus selecting means changes selection from said binary value data bus means to said multiple value image data bus means after said synchronization clock changing over means changes the clock signal setting from the transmission-stopping state to the transmitting state.

8. The image forming apparatus system as defined in claim 6, wherein said image data transmitting means changes over between transmitting the multiple value image data and the binary value image data, and wherein when the image data to be transmitted are changed over from the binary value image data to the multiple value image data, said image data bus selecting means changes selection from said binary value image data bus means to said multiple value image data bus means after said synchronization clock changing over means changes the clock signal setting from the transmission-stopping state to the transmitting state.

9. A method of forming an image, comprising the steps of:
transmitting image data from an image data transmitter and including transmitting multiple value image data by use of a multiple value image data bus and transmitting binary value image data by use of a binary value image data bus;
receiving at an image data receiver the image data transmitted by said image data transmitter;
transmitting a clock signal in synchronism with the multiple value image data through a clock line;
connecting said image data transmitter and said image data receiver to each other through said multiple value image data bus, said binary image data bus, and said clock line, and
wherein said step of transmitting the image data includes the substeps of:
selecting said multiple value image data bus at a time of transmitting the multiple value image data and selecting said binary value image data bus at a time of transmitting the binary value image data; and
setting the clock signal to a transmitting state at the time of transmitting the multiple value image data and setting the clock signal to a transmission-stopping state at the time of transmitting the binary value image data.

10. The method of forming an image as defined in claim 9, wherein in said step of transmitting the image data said image data transmitter changes over between transmitting the multiple value image data and the binary value image data, and wherein when the image data to be transmitted are changed over from the multiple value image data to the binary value image data, the clock signal setting is changed from the transmitting state to the transmission-stopping state after changing from selecting said multiple value image data bus to said binary value image data bus.

11. The method of forming an image as defined in claim 9, wherein in said step of transmitting the image data said image data transmitter changes over between transmitting the multiple value image data and the binary value image data, and wherein when the image data to be transmitted are changed from selecting the binary value image data to the multiple value image data, the image data bus is changed over from said binary value image data bus to said multiple value image data bus after changing over the clock signal setting from the transmission-stopping state to the transmitting state.

12. The method of forming an image as defined in claim 10, wherein in said step of transmitting the image data said image data transmitter changes over between transmitting the multiple value image data and the binary value image data, and wherein when the image data to be transmitted are changed over from the binary value image data to the multiple value image data, said image data bus is changed from selecting said binary value image data bus to said multiple value image data bus after changing the clock signal setting from the transmission-stopping state to the transmitting state.

* * * * *